(12) United States Patent
Han et al.

(10) Patent No.: US 8,764,409 B2
(45) Date of Patent: Jul. 1, 2014

(54) APPARATUS AND METHOD FOR CONTROLLING OPERATION OF COMPRESSOR

(75) Inventors: Jeong-Min Han, Changwon (KR); Sang-Myung Byun, Changwon (KR); Sang-Mo Kim, Changwon (KR)

(73) Assignee: LG Electronics Inc., Seoul (KR)

( * ) Notice: Subject to any disclaimer, the term of this patent is extended or adjusted under 35 U.S.C. 154(b) by 801 days.

(21) Appl. No.: 12/811,923

(22) PCT Filed: Jan. 6, 2009

(86) PCT No.: PCT/KR2009/000047
§ 371 (c)(1),
(2), (4) Date: Jul. 7, 2010

(87) PCT Pub. No.: WO2009/088203
PCT Pub. Date: Jul. 16, 2009

(65) Prior Publication Data
US 2010/0281898 A1    Nov. 11, 2010

(30) Foreign Application Priority Data

Jan. 8, 2008   (KR) .................. 10-2008-0002295
Jan. 10, 2008  (KR) .................. 10-2008-0003135

(51) Int. Cl.
*H02P 1/26*    (2006.01)
*H02P 1/44*    (2006.01)
*H02P 23/00*   (2006.01)
*H02P 25/00*   (2006.01)
*H02P 27/00*   (2006.01)
*F04B 49/06*   (2006.01)

(52) U.S. Cl.
USPC ............. 417/45; 417/44.1; 318/794; 318/795

(58) Field of Classification Search
USPC .......... 417/44.1, 44.11, 45, 53; 318/786, 790, 318/794–796, 798, 806, 751
See application file for complete search history.

(56) References Cited

U.S. PATENT DOCUMENTS 6,407,530 B1 *  6/2002  Kwon et al. .................. 318/778
7,402,976 B2 *  7/2008  Lee et al. ..................... 318/785

(Continued)

FOREIGN PATENT DOCUMENTS

CN   1740568   3/2006
EP   1100190   5/2001

(Continued)

OTHER PUBLICATIONS

International Search Report issued in PCT/KR2009/000047 dated Jun. 1, 2010.

(Continued)

*Primary Examiner* — Peter J Bertheaud
(74) *Attorney, Agent, or Firm* — Ked & Associates LLP

(57) ABSTRACT

An apparatus and method for controlling an operation of a compressor are disclosed to enhance a compressor efficiency in each operation mode in operating a compressor in a power mode or power saving mode according to an external load. The apparatus for controlling an operation of a compressor, including: a controller that generates a control signal to select an operation mode of the compressor according to an operation load of the compressor; a compressor motor that includes a main coil and a sub-coil and is driven in one of a plurality of operation modes according to a control signal of the controller; and a power supply unit that applies power via capacitors each having a different capacitance to the sub-coil of the compressor motor according to a control signal of the controller.

11 Claims, 5 Drawing Sheets

(56) References Cited

U.S. PATENT DOCUMENTS

| | | | |
|---|---|---|---|
| 7,859,801 B2 * | 12/2010 | Roh et al. | 361/22 |
| 8,221,091 B2 * | 7/2012 | Kim et al. | 417/44.11 |
| 8,371,824 B2 * | 2/2013 | Jeong et al. | 417/44.11 |
| 2005/0184687 A1 * | 8/2005 | Hong et al. | 318/66 |
| 2006/0045753 A1 * | 3/2006 | Jeong et al. | 417/45 |

FOREIGN PATENT DOCUMENTS

| | | |
|---|---|---|
| EP | 1 246 348 A2 | 10/2002 |
| EP | 1 679 439 A2 | 7/2006 |
| GB | 2292847 | 3/1996 |
| JP | 60-032583 | 2/1985 |
| JP | 04-340394 | 11/1992 |
| JP | H0742903 | 5/1995 |
| JP | 2004-144026 | 5/2004 |
| JP | 2007-224874 | 9/2007 |
| KR | JP H09250484 A | 9/1997 |
| KR | 10-2005-0050972 A | 6/2005 |
| WO | WO 2007/089083 A2 | 8/2007 |
| WO | WO2007089083 * | 8/2007 |
| WO | WO 2007/136198 A1 | 11/2007 |

OTHER PUBLICATIONS

Chinese Office Action dated Dec. 5, 2012. (with translation).
European Search Report dated Mar. 22, 2011 (Application No. 09700793.4-2315/2229534.
Korean Office Action dated Mar. 24, 2014.

* cited by examiner ate heat, an expansion valve for lowering the pressure of the condensed refrigerant, and an evaporator for evaporating the refrigerant which has passed through the expansion valve to absorb external heat.
APPARATUS AND METHOD FOR CONTROLLING OPERATION OF COMPRESSOR

TECHNICAL FIELD

The present invention relates to a capacity-variable compressor and, more particularly, to an apparatus and method for controlling an operation of a compressor capable of enhancing a compressor efficiency in each operation mode in operating a compressor in a power mode or power saving mode according to an external load.

BACKGROUND ART

In general, air-conditioners, refrigerators, show cases, and the like, include a refrigerating cycle system. The refrigerating cycle system includes a compressor for compressing a refrigerant, a condenser for condensing the compressed refrigerator to release heat, an expansion valve for lowering the pressure of the condensed refrigerant, and an evaporator for evaporating the refrigerant which has passed through the expansion valve to absorb external heat.

The compressor, the condenser, the expansion valve and the evaporator are connected by a connection pipe, forming a cycle.

In the refrigerating cycle system, as the compressor is operated upon receiving power, high temperature and high pressure refrigerant discharged from the compressor sequentially passes through the condenser, the expansion valve and the evaporator, and then sucked into the compressor, and this process is repeated. In this process, heat is generated from the condenser and the evaporator absorbs external heat to form cold air.

The refrigerator and the show case keeps food items freshly using the cold air generated from the evaporator of the refrigerating cycle system. The air-conditioner selectively circulates heat generated from the condenser of the refrigerating cycle system and cold air formed by the evaporator in a room to maintain the indoor space in an agreeable state.

The refrigerator and the show case are constantly used regardless of the change of the season, while the usage degree of the air-conditioner differs according to seasons.

That is, the usage degree of the air-conditioner is high during summer while it is low in the spring and autumn. Thus, because the usage degrees of the air-conditioner differs according to the summer, spring or autumn, power consumption of the air-conditioner can be considerably reduced by properly changing the operation mode of the air-conditioner.

In particular, recently, the oil prices rise due to the increase in the amount of oil usage worldwide, research and development of an air-conditioner that can minimize power consumption is a key subject. The reduction in power consumption of the air-conditioner would lead to a minimized environment problem.

The refrigerating capacity of the refrigerating cycle system is determined by a compression capacity of the compressor in compressing the refrigerant, and as the compression capacity of the compressor is large, the amount of cold air formed by the evaporator of the refrigerating cycle system is increased, and as the compression capacity of the compressor is small, the amount of cold air formed by the evaporator is reduced.

Thus, in order to effectively operate the refrigerating cycle system, if much cold air is required, the compression capacity of the compressor should be increased, while if a small amount of cold air is required, the compression capacity of the compressor should be reduced.

FIG. 1 is a schematic view showing a general compressor. As shown in FIG. 1, generally, the compressor includes a motor mechanism (motor) for converting electrical energy into kinetic energy and a compression mechanism compresses a refrigerant upon receiving turning force of the motor mechanism.

One of methods for varying the compression capacity of the compressor may be varying the number or rotations of the motor mechanism (motor).

However, if the number of rotations of the motor mechanism is varied, the motor mechanism is high-priced to increase the unit cost of the compressor, resulting in that the competitiveness of the product is degraded.

Thus, research for varying the compression capacity of the refrigerant in the compression mechanism while the number of rotations of the motor mechanism that generate a driving force for compressing the refrigerant is maintained to be uniform is ongoing.

However, the compressor having such a capacity-variable structure as shown in FIG. 1 is operated in a power mode and a power saving mode by using a single capacitor with a single capacitance. Thus, as shown in FIGS. 2 and 3, the compressor has good efficiency in the power mode compared with that in the power saving mode.

This is because, a constant (steady)-speed motor has a better efficiency at an output point in the power mode than at an output point in the power saving mode. Namely, the constant speed motor is not an inverter motor, so it cannot obtain equal efficiency at various output points.

FIG. 2 is a graph showing the relationship between a magnetomotive force (MMF) and a phase angle when the compressor is operated in the power mode, and FIG. 3 is a graph showing the relationship between an MMF and a phase angle when the compressor is operated in the power saving mode. In other words, the motor can have the highest efficiency when the MMF of the main coil (or main winding) and that of the sub-coil (or sub-winding) of the motor are the same (MMF ratio=1) and when the phase angle of the main coil and the sub-coil is a right angle (90°).

$$MMF=N*I \qquad \text{[Equation 1]}$$

wherein 'N' is the number of windings, and 'I' is current flowing across the coils.

The MMF is a force as a motive power that generates a magnetic flux in a magnetic circuit, which corresponds to an electromotive force in an electric circuit. The size of the MMF is indicated as a force when a unit normal polarity turns full circle according to magnetic circuits.

DISCLOSURE OF INVENTION

Technical Problem

However, in the related art, when the compressor is controlled, it is operated in the power mode and the power saving mode with the single capacitor having a single capacitance, so the MMF of the main coil and that of the sub-coil are different in the power saving mode, and because the phase angle of the main coil and the sub-coil are not a right angle, the motor efficiency is degraded.

Technical Solution

Therefore, in order to address the above matters, the various features described herein have been conceived. One aspect of the exemplary embodiments is to provide an apparatus and method for controlling an operation of a compressor capable of increasing the motor efficiency in a power saving mode by dualizing a capacitor in a power mode and the power saving mode, respectively.

Another aspect of the present invention is to provide an apparatus and method for controlling an operation of a compressor, whereby two capacitors are connected in parallel and switching is controlled to use a capacitor of a small capacitance in a power saving mode and to use a capacitor of a large capacitance in a power mode.

Still another aspect of the present invention is to provide an apparatus and method for controlling an operation of a compressor whereby a capacitor is dualized and switched to be properly used in a power mode and a power saving mode to thereby improve a motor efficiency in each mode.

This specification provides an apparatus for controlling an operation of a compressor, including: a controller that generates a control signal to select an operation mode of the compressor according to an operation load of the compressor; a compressor motor that includes a main coil and a sub-coil and is driven in one of a plurality of operation modes according to a control signal of the controller; and a power supply unit that applies power via capacitors each having a different capacitance to the sub-coil of the compressor motor according to a control signal of the controller.

This specification also provides a method for controlling an operation of a compressor, including: determining an operation mode of the compressor when the operator is operating; and simultaneously applying power to a main coil and a sub-coil of a compressor motor via capacitors each having a different capacitance.

This specification also provides an apparatus for controlling an operation of a compressor, including a controller that generates a control signal for selecting an operation mode of the compressor according to an operation load of the compressor; a compressor motor that includes a main coil and a sub-coil and is driven one of a plurality of operation modes according to a control signal of the controller; a multi-capacitor having a plurality of capacitances; a power supply unit that includes the multi-capacitor and applies the current of one of the plurality of capacitances to the sub-coil according to a control signal of the controller.

This specification also provides a method for controlling an operation of a compressor, including: charging the voltage of a first capacitance for a power saving mode and that of a second capacitance for a power mode to a single multi-capacitor; determining an operation mode of the compressor; and applying the current of the first capacitance or that of the second capacitance to a motor of the compressor according to the determination result.

The foregoing and other objects, features, aspects and advantages of the present invention will become more apparent from the following detailed description of the present invention when taken in conjunction with the accompanying drawings.

Advantageous Effects

The apparatus and method for controlling an operation of the compressor according to the first embodiment of the present invention has the following advantage.

That is, because switching is performed to use a capacitor of different capacitance according to an operation mode when the capacity-variable compressor is operated, the motor efficiency in the power saving mode can be increased. Also, in operating the capacity-variable compressor, the capacitor of the small capacitance is used in the power saving mode and the capacitor of the large capacitance is used in the power mode, so the motor efficiency in the power saving mode can be increased.

In addition, the apparatus and method for controlling an operation of the compressor according to the second embodiment of the present invention has such advantage that, because the capacitor is dualized to use a single capacitor having a plurality of capacitances, the efficiency of the compressor can be improved and the production cost of the compressor motor can be lowered.

BEST MODE FOR CARRYING OUT THE INVENTION

Figure 1:
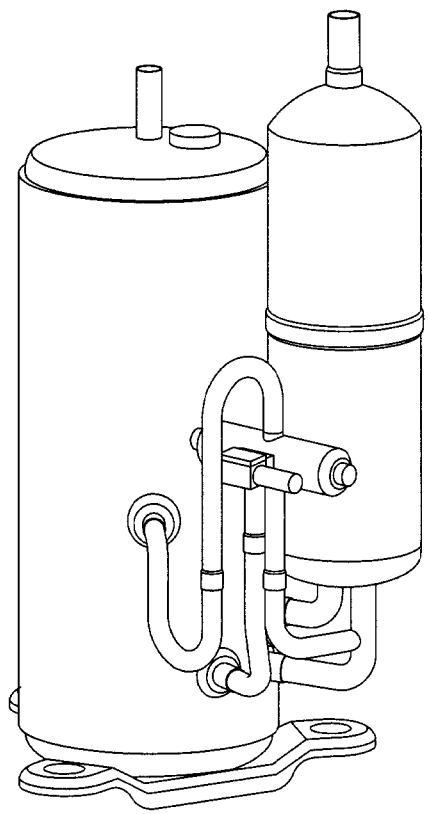
FIG. 1 is a schematic view showing a general compressor.
Figure 2:
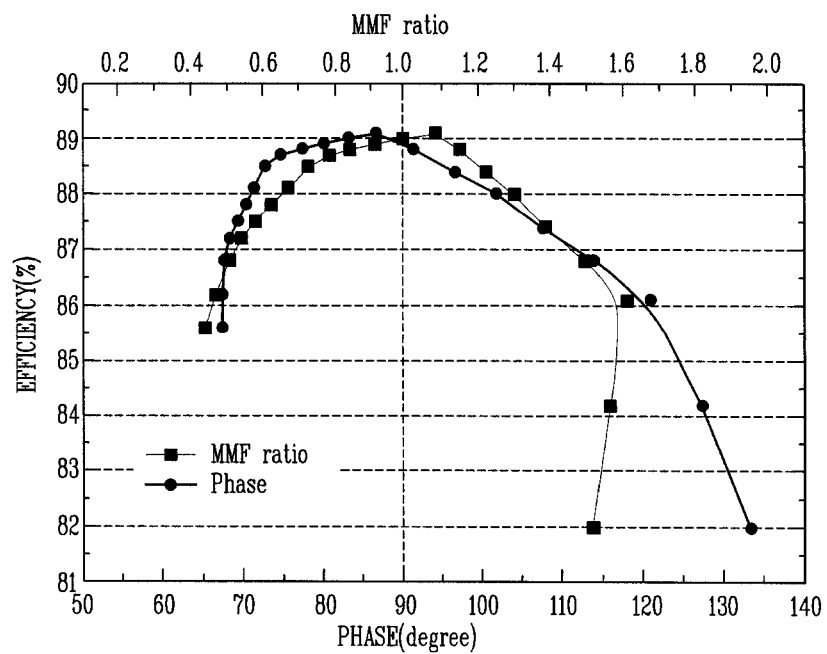
FIG. 2 is a graph showing the relationship between a magnetomotive force (MMF) and a phase angle when a compressor is operated in a power mode according to the related art.

The apparatus and method for controlling an operation of a compressor according to exemplary embodiments of the present invention will now be described with reference to the accompanying drawings. In describing the present invention, if a detailed explanation for a related known function or construction is considered to unnecessarily divert the gist of the present invention, such explanation will be omitted but would be understood by those skilled in the art. The same reference numerals will be given to the elements having the same function.

Figure 4:
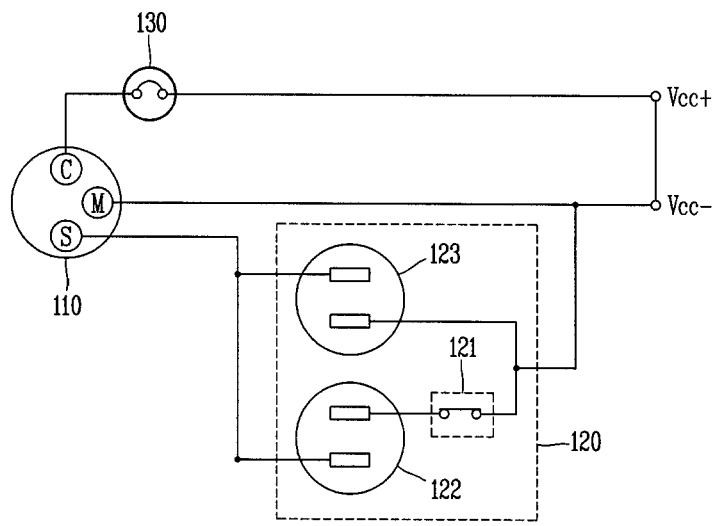
FIG. 4 is a circuit diagram showing an apparatus for controlling an operation of a compressor according to a first embodiment of the present invention.

FIG. 4 is a circuit diagram showing an apparatus for controlling an operation of a compressor according to a first embodiment of the present invention.

With reference to FIG. 4, the apparatus for controlling an operation of a compressor according to the present invention includes: a controller (not shown) that generates a control signal to select an operation mode of the compressor according to an operation load of the compressor; a compressor motor 110 that includes a main coil and a sub-coil and is driven in a plurality of operation modes according to a control signal of the controller; and a power supply unit 120 that applies power to the sub-coil of the compressor motor 110 according to a control signal of the controller.

The power supply unit 120 includes a relay 121 switched by a control signal outputted from the controller according to an operation mode of the compressor, a first capacitor 122 connected in series to the relay 121 so as to be connected to a power applying terminal (S) of the sub-coil, and a second capacitor 123 connected in parallel with the relay 121 and the first capacitor 122. Here, in the present invention, various switching elements may be used in place of the relay.

The relay 121 cuts off power supply to the first capacitor 122 by a control signal outputted from the controller in a power saving mode to thus allow power to be supplied to the sub-coil only via the second capacitor. In addition, the relay 121 applies power to the first capacitor 122 by a control signal outputted from the controller to allow power to be applied to the sub-coil via the first and second capacitors 122 and 123 in a power mode.

When the voltage inputted to the compressor is changed or when an operation load of the compressor is changed, the controller changes the operation mode of the compressor to the power mode or the power saving mode. Namely, when the operation load of the compressor is larger than a pre-set reference load, the controller changes the operation mode of the compressor to the power mode, and when the operation load of the compressor is smaller than the pre-set reference load, the controller changes the operation mode of the compressor to the power saving mode.

As described above, because the motor efficiency is maximized in the power mode and reduced in the power saving mode, the present invention provides two capacitors through which power passes when applied to the sub-coil, so that power can be applied via a capacitor of a larger capacitance in the power mode and applied via a capacitor of a smaller capacitance in the power saving mode.

In this case, however, a single capacitor of large capacitance incurs more costs compared with the case of using two capacitors of small capacitance, so a capacitor of large capacitance and a capacitor of small capacitance are simply installed to be switched would cause an increase in the costs.

Thus, in the first embodiment of the present invention, first and second capacitors each having small capacitance are connected in parallel, so that, in the power mode, the first and second capacitors serve as a capacitor of large capacitor by adding their capacitances, and in the power saving mode, power is applied only via the second capacitor of small capacitance, thereby not causing an increase in the costs. Of course, three or more capacitors may be used.

Here, the number of windings of the main coil and that of the sub-coil may be different or the same. In addition, the capacitance of the first and second capacitors 122 and 123 may be determined based on an inductance value of the motor coil.

Mode for the Invention

A method for controlling the operation of the compressor according to the first embodiment of the present invention will now be described with reference to FIG. 5.

Figure 5:
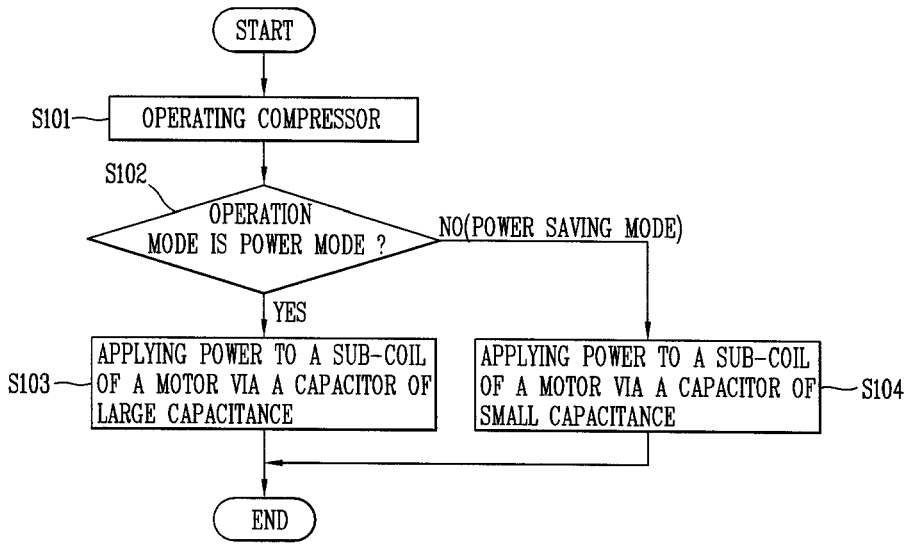
FIG. 5 is a flow chart illustrating the process of a method for controlling an operation of the compressor according to the first embodiment of the present invention.

FIG. 5 is a flow chart illustrating the process of the method for controlling the operation of the compressor according to the first embodiment of the present invention.

First, the controller operates the compressor according to an operation load of the compressor (S101).

Namely, when the operation load of the compressor is larger than a pre-set reference load, the operation mode of the compressor is changed to the power mode.

As the operation mode of the compressor is changed to the power mode (S102), a control signal is outputted to turn on the relay 121. As the relay is turned on, power is applied to the sub-coil through the combined capacities of the first and second capacitors 122 and 123 (S103).

Meanwhile, if the operation load of the compressor is smaller than the pre-set reference load, the operation mode of the compressor is changed to the power saving mode.

As the operation mode of the compressor is changed to the power saving mode (S 102), a control signal is outputted to turn off the relay 121. As the relay 121 is turned off, power applied to the first capacitor 122 is cut off and power is applied to the sub-coil only via the second capacitor 123 of small capacitance (S104).

The reason for applying power to the sub-coil via the capacitors of different capacitances according to the operation mode is to make the MMF of the main coil and that of the sub-coil of the motor the same in the power mode (MMF ratio=1) and make the phase angle of the main-coil and the sub-coil a right angle (90°), to thereby maximizing the efficiency. The principle of generating such effect is because a resonance operation is performed by the inductance (L) according to the coil of the motor and the capacitance (C) of the capacitors.

Figure 3:
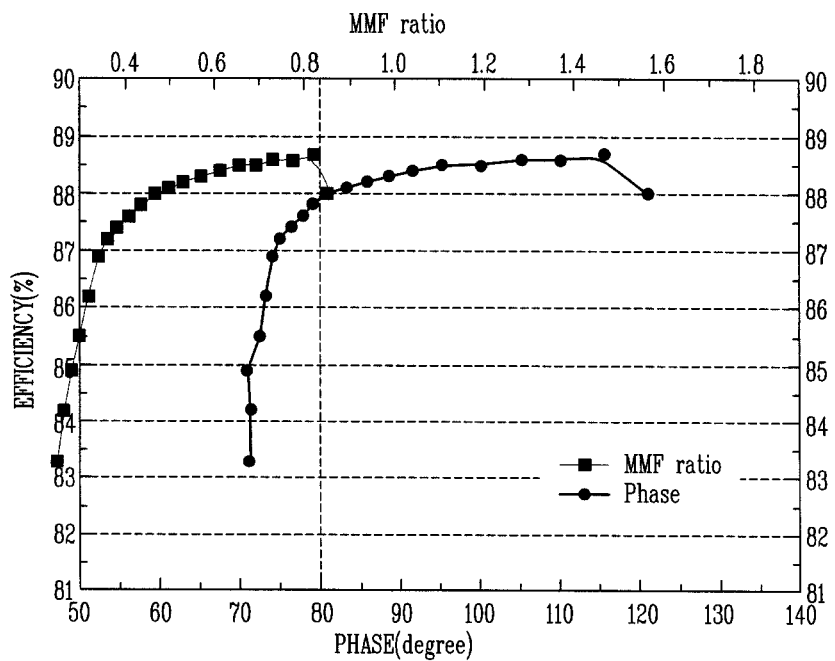
FIG. 3 is a graph showing the relationship between an MMF and a phase angle when the compressor is operated in a power saving mode according to the related art.
Figure 6:
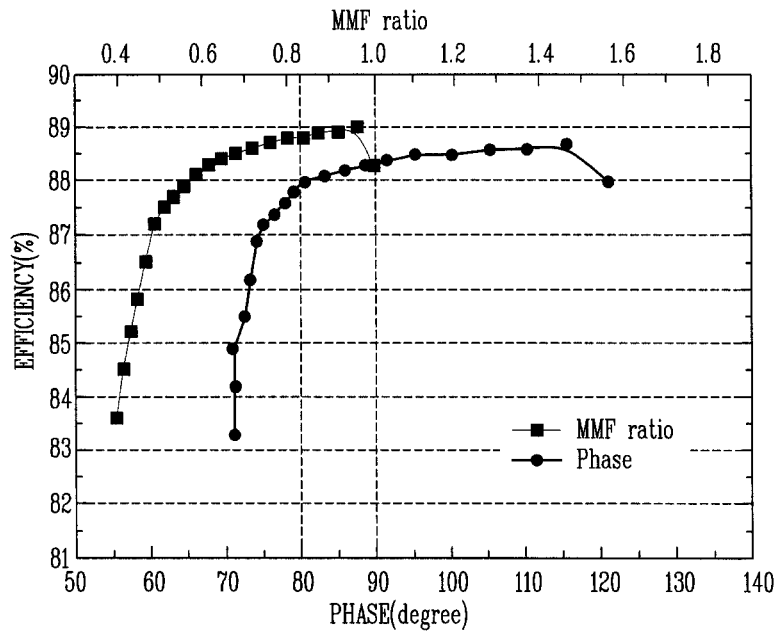
FIG. 6 is a graph showing the relationship between an MMF and a phase angle when the compressor is operated in a power saving mode according to the first embodiment of the present invention.

FIG. 6 is a graph showing the relationship between an MMF and a phase angle when the compressor is operated in a power saving mode according to the first embodiment of the present invention. When compared with the graph in the related art power saving mode as shown in FIG. 3, it is noted in FIG. 6 that, in the present invention, the MMF ratio is changed from 0.8 to 1 and the phase angle is changed from 80° to 90°.

Because the motor efficiency is maximized when the MMF ratio is 1 and the phase angle is 90°, the compressor according to the present invention can be operated with the maximum efficiency even in the power saving mode as well as in the power mode.

Figure 7:
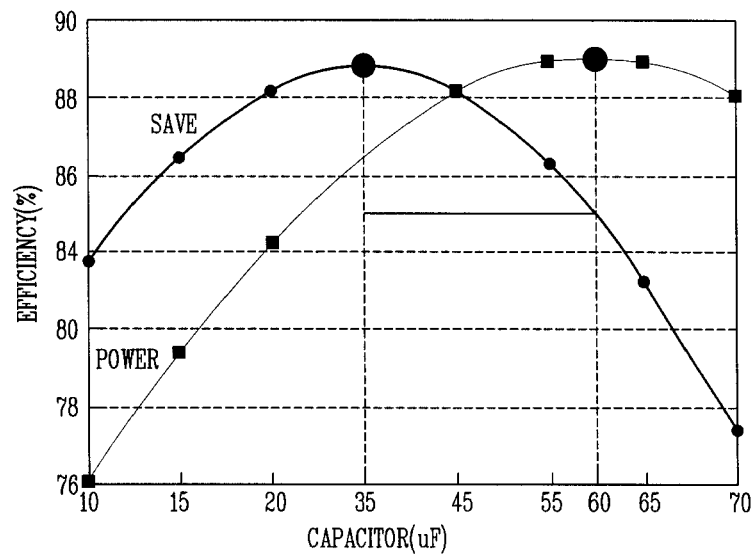
FIG. 7 is a graph showing efficiency according to the capacitance of a capacitor used for controlling an operation of the compressor according to the first embodiment of the present invention.

FIG. 7 is a graph showing an efficiency according to the capacitance of a capacitor used for controlling an operation of the compressor according to the first embodiment of the present invention, in which, in the power mode, the maximum efficiency can be obtained when the capacitance of the capacitor is 60 µF and, in the power saving mode, the maximum efficiency is obtained when the capacitance of the capacitor is 35 µF which is small.

In other words, if only the single capacitor of 60 µF that can generate the maximum efficiency is used in the power mode, a maximum 85% of efficiency can be generated in the power saving mode, while when the capacitor is dualized and the capacitor of 35 µF is used in the power saving mode, 89% of efficiency can be obtained. That is, approximately 3.7% of efficiency can be increased.

Of course, the capacitance of the first and second capacitors is not limited to the above-mentioned values, but may be determined based on the inductance value of the motor coils.

Figure 8:
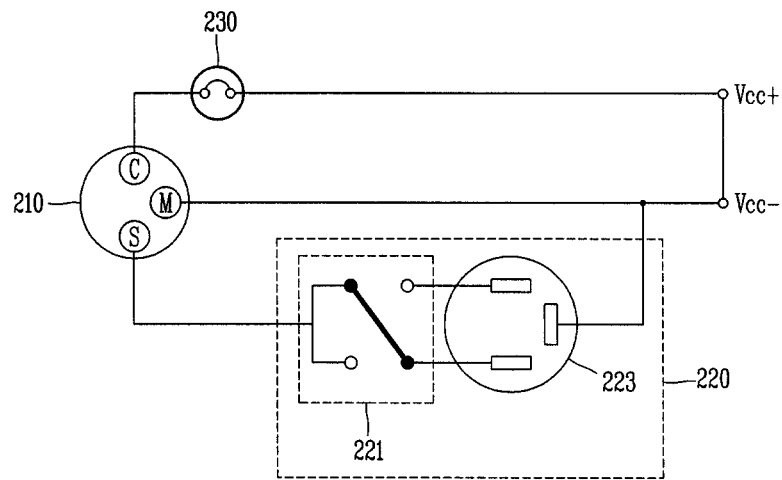
FIG. 8 is a circuit diagram schematically showing an apparatus for controlling an operation of a compressor according to a second embodiment of the present invention.

With reference to FIG. 8, an apparatus for controlling an operation of a compressor according to a second embodiment of the present invention includes a controller that generates a control signal to select an operation mode of the compressor according to an operation mode of the compressor, a compressor motor 210 that includes a main coil and a sub-coil and is driven in one of a plurality of operation modes according to a control signal of the controller; a multi-capacitor 223 including a plurality of capacitances; and a power supply unit 220 that has the multi-capacitor 223 and applies the current of one of the plurality of capacitances to the sub-coil according to a control signal of the controller.

Figure 9:
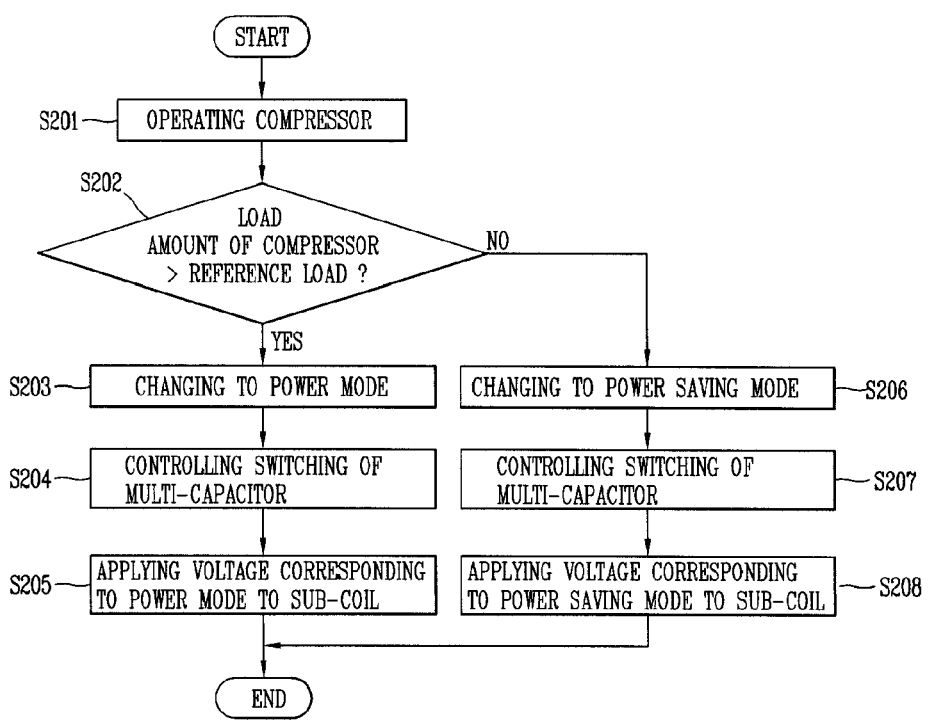
FIG. 9 is a flow chart showing the process of a method for controlling an operation of a compressor according to the second embodiment of the present invention.

As shown in FIG. 9, the method for controlling an operation of the compressor according to the second embodiment of the present invention includes charging the voltage of the first capacitance for a power saving mode and the voltage of a second capacitance for a power mode in a single multi-capacitor (S201); determining an operation mode of the compressor (S202); and applying the current of the first capacitance or that of the second capacitance to a motor of the compressor according to the determination result (S203 to S208).

The present invention implements capacitor dualization in the power mode and in the power saving mode by using a single capacitor.

FIG. 8 is a circuit diagram schematically showing an apparatus for controlling an operation of a compressor according to the second embodiment of the present invention.

The apparatus for controlling an operation of the compressor according to the second embodiment of the present invention includes a single capacitor having a plurality of capacitances for capacitor dualization of the power mode and the power saving mode. As shown in FIG. 8, the apparatus for controlling an operation of the compressor includes a compressor motor 210 having a main coil (M), a sub-coil (S) and a common terminal (C), an overload protector 230, a controller (not shown), and a power supply unit 220.

The power supply unit 220 includes a relay switch 221 and a multi-capacitor 223 having two capacitances. The capacitor 223 connects an input terminal to a first power input terminal Vcc and connects first and second output terminals, each outputting currents of first and second capacitances, to the relay switch 221.

As the multi-capacitor 223, a capacity-variable capacitor is preferably used, which constitutes the power supply unit 220 by being connected (or switched) with the switch 221. The power supply unit 220 has the same effect as that of the dualization of two capacitors as in the first embodiment, and, in terms of costs, the power supply unit 200 can reduce the cost (material cost) of about 40% compared with the case where two capacitors are used.

The overload protector 230 is positioned between the second power voltage terminal (Vcc-) and the common terminal (C), and prevents application of an overload of higher than a certain value to the motor. The relay switch 221 is positioned between the sub-coil (S) and the capacitor 223, and applies a current according to the first capacitance to the sub-coil (S) or a current according to the second capacitance.

That is, in the power saving mode, the relay switch 221 connects the first output terminal of the multi-capacitor 223 to the sub-coil (S), and in the power mode, the relay switch 221 connects the second output terminal of the multi-capacitor 223 to the sub-coil (S).

The controller controls switching of the power supply unit 220 according to a load amount applied to the motor to change the motor to the power mode or the power saving mode.

FIG. 9 is a flow chart showing the process of a method for controlling an operation of a compressor according to the second embodiment of the present invention.

In general, the motor of the compressor improves its efficiency by changing the strength of a magnetic field according to the amount of a load applied to the motor. Once the compressor starts (S201), the controller (not shown) checks the amount of load by monitoring a state of the motor (S202). If the load amount of the compressor is larger than or the same as a reference value, the controller changes the state of compressor to the power mode (S203).

And the controller controls the relay switch 221 to charge the voltage of the second capacitance (S204, S205). When the state of the compressor is changed to the power mode, the motor increases the strength of the magnetic field to increase stroke. If the load amount is smaller than the reference value, the controller changes the state of the motor to the power saving mode (S206). And the controller controls the relay switch 221 to charge the voltage of the first capacitance (S207, S208). When the state of the compressor is changed to the power saving mode, the motor reduces the strength of the magnetic field to reduce the stroke of the motor.

As so far described, the apparatus and method for controlling an operation of the compressor according to the first embodiment of the present invention has the following advantage.

That is, because switching is performed to use a capacitor of different capacitance according to an operation mode when the capacity-variable compressor is operated, the motor efficiency in the power saving mode can be increased. Also, in operating the capacity-variable compressor, the capacitor of the small capacitance is used in the power saving mode and the capacitor of the large capacitance is used in the power mode, so the motor efficiency in the power saving mode can be increased.

In addition, the apparatus and method for controlling an operation of the compressor according to the second embodiment of the present invention has such advantage that, because the capacitor is dualized to use a single capacitor having a plurality of capacitances, the efficiency of the compressor can be improved and the production cost of the compressor motor can be lowered.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An apparatus for controlling operation of a compressor, the apparatus comprising:
    a controller that generates a control signal to select an operation mode of the compressor according to an operation load of the compressor;
    a compressor motor that includes a main coil and a sub-coil, which is driven in one of a plurality of operation modes according to the control signal, and that compresses a refrigerant in the compressor using a turning force with a uniform number of rotations of the compressor motor while a compression capacity of the compressor is varied according to the selected operation mode; wherein the compressor motor is only rotated in one direction; and
    a power supply that applies power via a plurality of capacitors, each having a different capacitance, to the sub-coil of the compressor motor according to the control signal.

2. The apparatus of claim 1, wherein the power supply comprises a relay that is switched by a control signal output from the controller according to the operation mode of the compressor.

3. The apparatus of claim 2, wherein the power supply further comprises:
    a first capacitor connected in series with the relay so as to be connected to a power application terminal of the sub-coil; and
    a second capacitor connected in parallel to the relay and the first capacitor.

4. The apparatus of claim 1, wherein, when the operation load of the compressor is smaller than a predetermined reference load, the controller operates the compressor in a power saving mode.

5. The apparatus of claim 1, wherein, when the operation load of the compressor is larger than a predetermined reference load, the controller operates the compressor in a power mode.

6. The apparatus of claim 3, wherein, in a power saving mode, the controller controls the relay to cut off power to the first capacitor, so that power can be applied to the sub-coil only via the second capacitor.

7. The apparatus of claim 3, wherein, in a power mode, the controller controls the relay to apply power to the first capacitor, so that power can be applied to the sub-coil via the first and second capacitors.

8. The apparatus of claim 3, wherein a switching operation of the relay is controlled so that the power supply applies power via an equivalent capacitor of large capacitance based on the first and second capacitors in a power mode, and applies power via an equivalent capacitor of small capacitance based on the first and second capacitors in a power saving mode.

9. A method for controlling operation of a compressor including a compressor motor, which includes a main coil and a sub-coil, the method comprising:

compressing a refrigerant of the compressor using a turning force with a uniform number of rotations of the compressor motor while a compression capacity of the compressor is varied according to an operation mode of the compressor;

rotating the compressor motor in only one direction;

determining the operation mode of the compressor when the compressor is operating; and applying power to the main coil and simultaneously applying the power to the sub-coil of the compressor motor via a plurality of capacitors each having a different capacitance according to the determination of the operation mode of the compressor.

10. The method of claim 9, wherein, in the applying the power, when the compressor is operated in a power mode, the power is applied to the main coil of the compressor motor and, simultaneously, the power is applied to the sub-coil of the compressor motor via a first capacitor and a second capacitor connected in parallel.

11. The method of claim 9, wherein, in the applying the power, when the compressor is operated in a power saving mode, the power is applied to the main coil of the compressor motor and, simultaneously, the power is applied to the sub-coil of the compressor motor via one of a first capacitor and a second capacitor connected in parallel.

* * * * *